United States Patent
Kochi et al.

(10) Patent No.: US 6,810,142 B2
(45) Date of Patent: Oct. 26, 2004

(54) STEREO IMAGE MEASURING DEVICE

(75) Inventors: Nobuo Kochi, Tokyo (JP); Hitoshi Otani, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 662 days.

(21) Appl. No.: 09/887,268

(22) Filed: Jun. 25, 2001

(65) Prior Publication Data

US 2002/0012460 A1 Jan. 31, 2002

(30) Foreign Application Priority Data

Jun. 26, 2000 (JP) ........................................ 2000-191121

(51) Int. Cl.[7] ................................................ G06K 9/00
(52) U.S. Cl. ........................ 382/154; 382/293; 382/282; 345/419
(58) Field of Search ................................ 382/154, 276, 382/153, 151, 293, 294, 295, 284, 285, 287; 345/419, 427; 348/42, 46, 47, 48, 51, 52; 356/2, 12, 14; 702/167

(56) References Cited

U.S. PATENT DOCUMENTS

| | | | | |
|---|---|---|---|---|
| 4,803,645 A | * | 2/1989 | Ohtomo et al. | 702/167 |
| 4,834,530 A | * | 5/1989 | Murai et al. | 356/2 |
| 4,951,136 A | * | 8/1990 | Drescher et al. | 348/145 |
| 5,550,937 A | * | 8/1996 | Bell et al. | 382/293 |
| 6,141,439 A | * | 10/2000 | Yoshida et al. | 382/154 |
| 6,442,292 B1 | * | 8/2002 | Otani et al. | 382/154 |
| 6,442,293 B1 | * | 8/2002 | Ito et al. | 382/154 |

* cited by examiner

Primary Examiner—Samir Ahmed
(74) Attorney, Agent, or Firm—Foley & Lardner LLP

(57) ABSTRACT

A stereo image measuring device capable of facilitating determination as to the correctness of the result of stereo image corresponding point measurement is disclosed. The stereo image measuring device comprises: a first display unit including a normal monitor; a second display unit including a stereo-monitor enabling stereoscopic viewing; a mark formation unit for displaying a mouse cursor; an instruction unit for instructing X, Y and Z directions; a corresponding area search unit for searching a corresponding area with respect to a reference area; a corresponding area position verification unit for verifying the coincidence of the searched area with the position of the reference area; a corresponding area deciding unit for deciding the searched corresponding area as a corresponding area; a storage unit for storing the verification result of the corresponding area position verification unit, the reference area, the corresponding area, and the decided corresponding area decided by the corresponding area deciding unit; a decided corresponding area correction unit for correcting the decided corresponding area; an image storage unit for storing a digitized stereo image; and a display memory for displaying an image. The instruction unit includes a planar direction instruction unit for instructing the planar (X, Y) direction of the reference area by a mouse, and a Z direction instruction unit for instructing a depth (Z) direction during three-dimensional measurement.

15 Claims, 11 Drawing Sheets

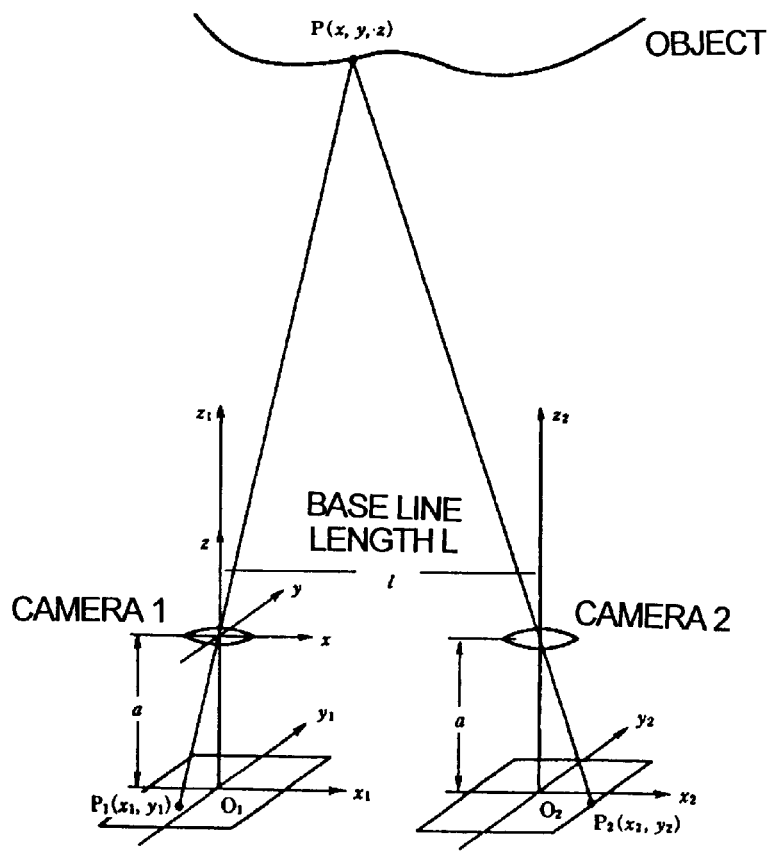
F I G. 3

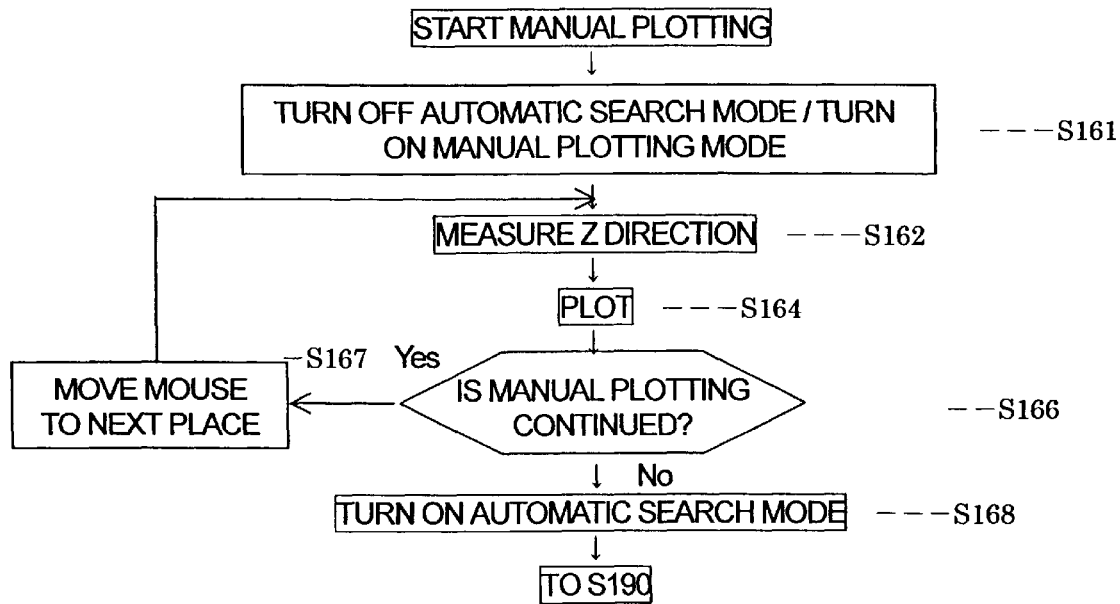
F I G. 1 0

STEREO IMAGE MEASURING DEVICE

BACKGROUND OF THE INVENTION

The present invention relates to a stereo image measuring device for performing three-dimensional measurement and plotting from a stereo image. More particularly, the present invention relates to a stereo image measuring device for performing three-dimensional measurement and plotting automatically or manually while a human operator and a device mutually (interactively) performing an operation (real time correlation verification mode).

In recent years, line drawing has been made for a site to be measured by using, in combination, a surveying instrument, e.g., a pen-based mapping system, and a portable computer. In such a conventional pen-based mapping system, plotting has been carried out by drawing a line image on the portable computer, using a surveying instrument such as a total station, a GPS. The plotting of the site to be measured was carried out on site while watching the situation there, or in an office based on photographed images. In aerial photography, plotting was carried out by using an analytical plotting device or the like based on stereo photographed images.

Heretofore, the analytical plotting device has been used for performing three-dimensional measurement and plotting from a stereo image. In addition, in recent years, three-dimensional measurement and plotting have been carried out by a device, which uses digital photogrammetry.

However, in such devices, it was necessary to perform measuring and plotting work by using a handle, a foot switch or the like while watching a stereo-display, a stereoscope or the like. The measuring and plotting work carried out simultaneously while watching a stereo image necessitated much skill, making it impossible for an operator of ordinary skill to carry out the work. In addition, there is a digital photogrammetry device for preforming measurement and plotting by using a three-dimensional mouse or the like instead of the handle or the foot switch. In this case, however, the operation is difficult, because the work must also be carried out while watching a stereo image, thus necessitating much skill. Conversely, there is a device for measurement, which uses no stereo-displays. For such a device, however, verification as to the correctness of a measuring result is difficult. Thus, there is no way of knowing whether the result of measurement is correct and reliable or not.

SUMMARY OF THE INVENTION

The present invention was made with the foregoing problems in mind, and it is an object of the present invention to facilitate determination as to correctness of the corresponding point measuring result of a stereo image. It is another object of the present invention to provide a measuring device, which enables anybody to perform measuring and plotting easily without needing any skill.

In accordance with a first aspect of the present invention, a stereo image measuring device is provided, comprising:

a display unit for displaying a pair of stereo images;

an instruction unit for instructing a reference area in one of the displayed pair of stereo images by an operation executed by an operator;

a corresponding area search unit for obtaining an area corresponding to the reference area instructed in one of the stereo images, in the other of the pair of stereo images;

a mark formation unit for forming a mark indicating the reference area instructed by the instruction unit and a mark indicating a corresponding point searched by the corresponding area search unit on the pair of stereo images respectively;

a corresponding area deciding unit for deciding a searched corresponding area searched by the corresponding area search unit as a corresponding area;

a storage unit for storing the decided corresponding area decided by the corresponding area deciding unit;

a decided corresponding area correction unit for correcting the decided corresponding area; and a corresponding area position verification unit for determining whether the corresponding area searched by the corresponding area search unit corresponds to the reference area instructed by the instruction unit.

In accordance with a second aspect of the present invention, a stereo image measuring device is provided, comprising:

a display unit for displaying a pair of stereo images;

an instruction unit for instructing a reference area in one of the displayed pair of stereo images by an operation executed by an operator;

a corresponding area search unit for obtaining an area corresponding to the reference area instructed in one of the stereo images, in the other of the pair of stereo images;

a mark formation unit for forming a mark indicating the reference area instructed by the instruction unit and a mark indicating a corresponding point searched by the corresponding area search unit on the pair of stereo images respectively;

a corresponding area deciding unit for deciding a searched corresponding area searched by the corresponding area search unit as a corresponding area;

a storage unit for storing the decided corresponding area decided by the corresponding area deciding unit;

a decided corresponding area correction unit for correcting the decided corresponding area; and a corresponding area position verification unit for determining whether the corresponding area searched by the corresponding area search unit corresponds to the reference area instructed by the instruction unit, wherein the display unit displays a result of determination verified by the corresponding area position verification unit to be identifiable, and according to a position instructed by the instruction unit, a search mode is interrupted to change to a correction mode.

BRIEF DESCRIPTION OF THE DRAWINGS

FIG. 3 is a view illustrating a stereo method.

FIG. 10 is a specific flow showing in detail manual plotting.

DESCRIPTION OF THE PREFERRED EMBODIMENTS

Figure 1:
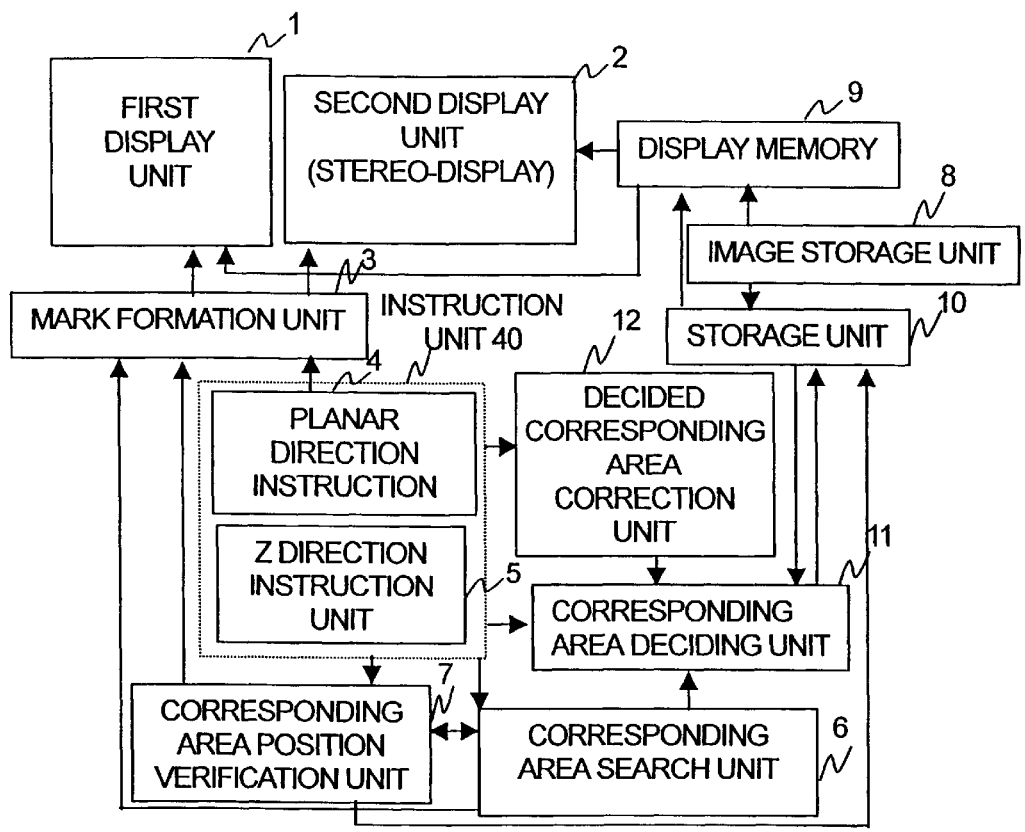
FIG. 1 is a constitutional view of a measuring device according to the present invention.

FIG. 1 is a constitutional view showing the measuring device of the present invention.

The device of the present invention comprises: a first display unit 1 including a normal monitor (CRT, liquid crystal or the like); a second display unit 2 including a stereo-monitor enabling stereoscopic viewing; a mark formation unit 3 for displaying a mouse cursor on the display unit; an instruction unit 40 for instructing X, Y and Z directions; a corresponding area search unit 6 for searching a corresponding area with respect to a reference area (it may be reverse); a corresponding area position verification unit 7 for verifying the coincidence of the searched area with the position of the reference area; a corresponding area deciding unit 11 for deciding the searched corresponding area as a corresponding area; a storage unit 10 for storing the verification result of the corresponding area position verification unit 7, the reference area, the corresponding area and the decided corresponding area decided by the corresponding area deciding unit 11 (measuring data as plotting data); a decided corresponding area correction unit 12 for correcting the decided corresponding area; an image storage unit 8 for storing a digitized stereo image; and a display memory 9 for displaying an image. The mark formation unit 3 functions to display not only the positions of the reference area and the corresponding area as marks but also a result obtained by searching the reference area in the corresponding area search unit 6 and by verifying the same in the corresponding area position verification unit 7 to be identifiable.

The instruction unit 40 includes a planar direction instruction unit 4 for instructing a planar (X, Y) direction of the reference area by a mouse, and a Z direction instruction unit 5 for instructing (or indicating) a depth (Z) direction by a dialing or the like during three-dimensional measurement.

The planar (X, Y) direction instruction unit 4 and the Z direction instruction unit 5 of the instruction unit 40 may be either united or separately provided. If these components are united, for example, a 3D mouse arrangement composed of a planar (X, Y) direction control mouse and a depth (Z) direction control dial can be provided. In addition, several buttons may be provided for use in establishing measuring data, the corresponding area deciding unit 11 and the decided corresponding area correction unit 12. If planar and depth direction control operations are separately executed, a personal computer mouse or the like can be used for the planar (X, Y) direction instruction unit 4 and, in this case, a mouse button can be used. The Z direction instruction unit 5 is composed of a Z direction control dial, a button, and so on. Such a button may be used for data establishment, the corresponding area deciding unit 11 and the decided corresponding area correction unit 12. In the present invention, for convenience of explanation, as an example, the instruction unit 40 uses the planar instruction unit 4 equipped with a personal computer mouse and the Z direction instruction unit equipped with a Z direction control dial, and the left button of the mouse is pressed to establish data.

The instruction unit 40 instructs a measuring position, a mark is formed by the mark formation unit 3 for the instructed position, and this position is then displayed on the first or second display unit 1 or 2. On an automatic search mode, a position corresponding to the instructed position of the instruction unit 40 can be always searched by the corresponding area search unit 6, verified by the corresponding area position verification unit 7, and the correctness thereof can be displayed to be identifiable by the mark formation unit 3. In addition, when the position is established as plotting data, position establishment is executed at the corresponding area deciding unit 11 by using the button of the instruction unit 40, and three-dimensional coordinate data thereof is stored in the storage unit 10, passed through the display memory 9 and then displayed on the display unit (plotting). Moreover, instead of identifiable displaying by the mark formation unit 3 on the automatic search mode, a result obtained by searching a position corresponding to the instructed position of the instruction unit 40 in the corresponding area search unit 6 and by verifying the same in the corresponding area position verification unit 7, and the reference and corresponding areas thereof may be stored in the storage unit 10.

The establishing and capturing of a measured value will be basically called a plot, and the entire operation thereof will be called plotting. Plotting data is basically a collection of points, indicating all of various plotted drawings including lines, a polygon, and so on. In addition, measuring/plotting is similar to the execution of three-dimensional measurement after all.

Furthermore, on the automatic search mode, based on a signal from the instruction unit 40, the decided corresponding area correction unit 12 is operated to change modes, and manual plotting or correction is executed. Especially, when the data having been stored (plotted) in the storage unit 10 is corrected, based on instruction from the decided corresponding area correction unit 12, a point to be corrected in the storage unit 10 is decided by the corresponding area deciding unit 11, and then corrected.

Figure 2:
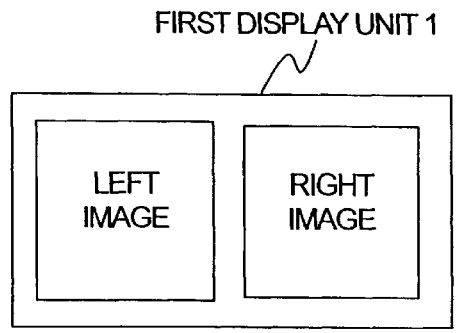
FIG. 2 is a view illustrating a display example of a first display unit.

FIG. 2 illustrates the display example of the first display unit 1.

As shown in FIG. 2, the first display unit 1 displays right and left images divided on one display.

The second display unit 2 is, for example, a stereo-display to enable stereoscopic viewing through 3D glasses. Regarding systems, there are a dual display system for displaying right and left images on two displays, synthesizing the images by a polarization filter, and observing the images through polarization glasses, a liquid crystal shutter system for alternately displaying the right and left images on one screen, and observing the images through liquid crystal or polarization glasses, and so on.

At the stereo image three-dimensional measuring and plotting device, measurement is enabled by the principle of the stereo method. This principle of the stereo method will be described below. FIG. 3 illustrates the stereo method.

Here, for simplicity, the principle of the stereo method will be described on the assumption that two similar cameras are used, the optical axes thereof are parallel to each other, distances a from the principal points of camera lenses to CCD surfaces are equal to each other, and each CCD is located perpendicularly to the optical axis.

A distance (base line length) between the two optical axes is set as L, and the following relation is established between the coordinates of points $P_1$ $(x_1, y_1)$ and $P_2$ $(x_2, y_2)$ on an object:

$$x_1 = ax/z \tag{1}$$

$$y_1 = y_2 = ay/z \tag{2}$$

$$x_2 - x_1 = a \times L/z \tag{3}$$

Here, the origin of an entire coordinate system (x, y, z) is set at the lens principal point of the camera 1. A value of z is obtained by the equation (3), and by using this z value, x and y can be obtained by the equations (1) and (2).

Figure 4:
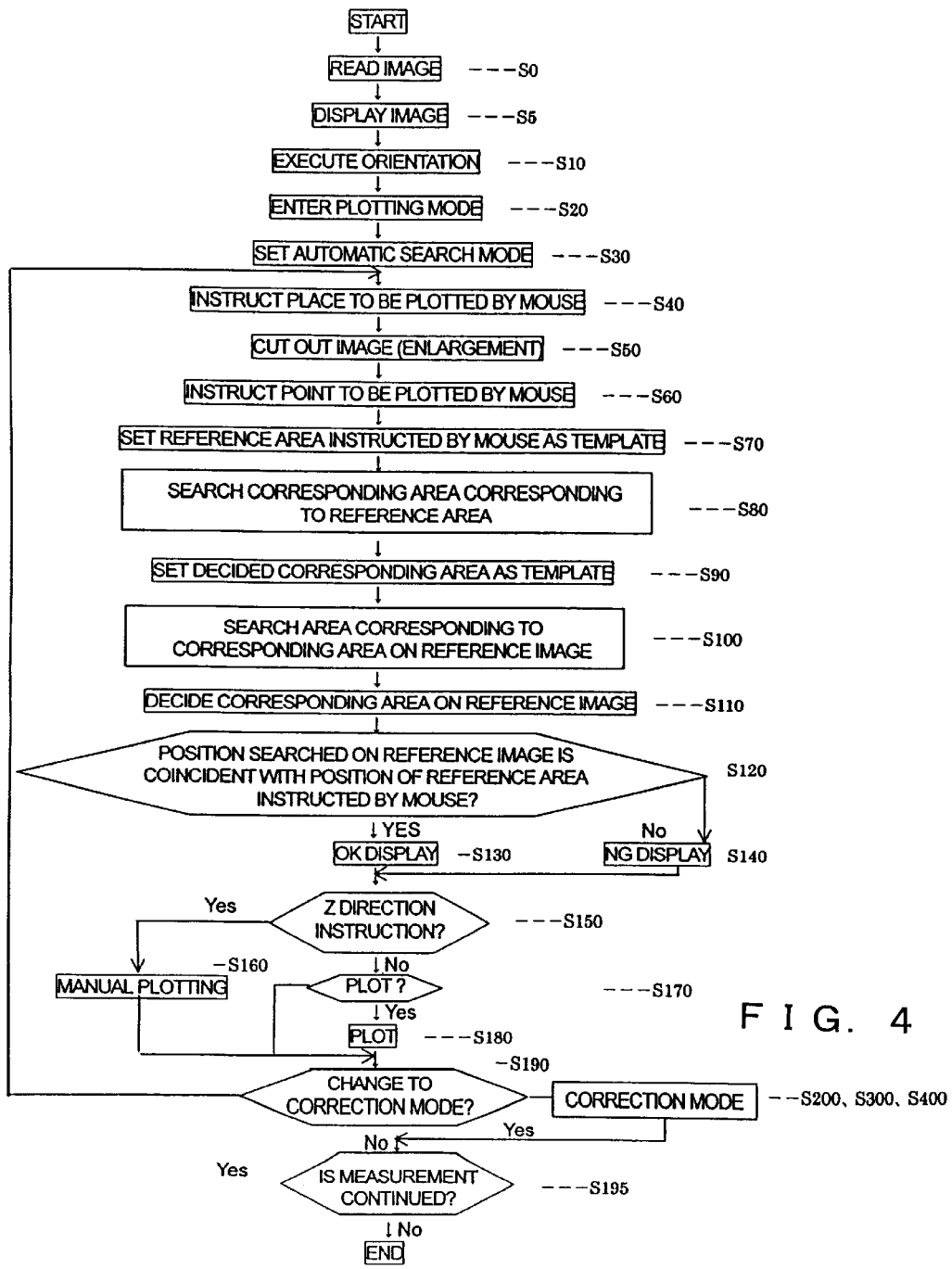
FIG. 4 is a first flowchart of stereo image measurement according to the invention.

FIG. 4 is a first flowchart showing stereo image measurement carried out according to the present invention.

In step S0, a digital image is read in the image storage unit 8 of the device. A stereo image is obtained by scanning a photograph taken by a general film camera or a measurement camera, or an aerial photograph with a scanner, and digitizing the photograph. Alternatively, a stereo image is directly obtained by a digital camera. Such obtained stereo (right and left) images are read and stored in the image storage unit 8 of the device. In step S5, each image captured in the image storage unit 8 is transferred to the display memory 9, and displayed on the display unit.

In step S10, orientation is executed. To enable stereo image measurement, an operation or processing called orientation is carried out. By this work, the measured position and inclination of the camera are calculated, and an image to be viewed stereoscopically is formed. In the stereoscopic viewing enabled state, stereo-measurement can be carried out based on the foregoing stereo method. At the orientation work, by measuring 6 or more reference or characteristic points displayed on the first or second display unit 1 or 2 on the right and left images, various parameters are calculated by calculation processing, and an image to be viewed stereoscopically is formed. The orientation is not described in detail, as it is not a main subject of the present invention. If the orientation is normally finished, an image subjected to rectification so as to be viewed stereoscopically is divided right and left and displayed on the first display unit 1. On the second display unit 2, the image is set to be stereoscopically viewed through glasses, and displayed.

In step S20, the process enters a plotting mode. At the initial stage of this mode, the entire target to be measured or an area over a wide range is displayed on the first or second display unit 1 or 2. Thus, manual plotting work can be executed by a mouse operation while watching the display. In the case of the work by the first display unit 1, plotting is enabled by moving the mouse on the right and left images while visually verifying right and left corresponding points. In the case of the work by the second display unit 2, plotting is enabled by instructing a planar direction by the mouse through the 3D glasses (planar direction instruction unit 4), and by controlling a height direction by the height direction Z direction instruction unit 5.

In step S30, the process enters the automatic search mode. On this mode, interactive automatic search is enabled. The manual plotting of step S20 is also enabled. However, on the automatic mode, anybody can perform plotting more easily. In step S40, first, a place to be plotted is instructed by the mouse while watching the first or second display unit 1 or 2. In step S50, an image about the instructed area is cut out, and displayed in an enlarged state. A magnification of enlargement has been properly set beforehand. By clicking the image, enlargement may be executed. In this case, for example, the mouse button is clicked several times until an image to be easily measured is formed. In this way, the image is adjusted to have a desired size. In step S60, when the image of a desired size is cut out, a point to be plotted is instructed by the mouse.

Figure 5:
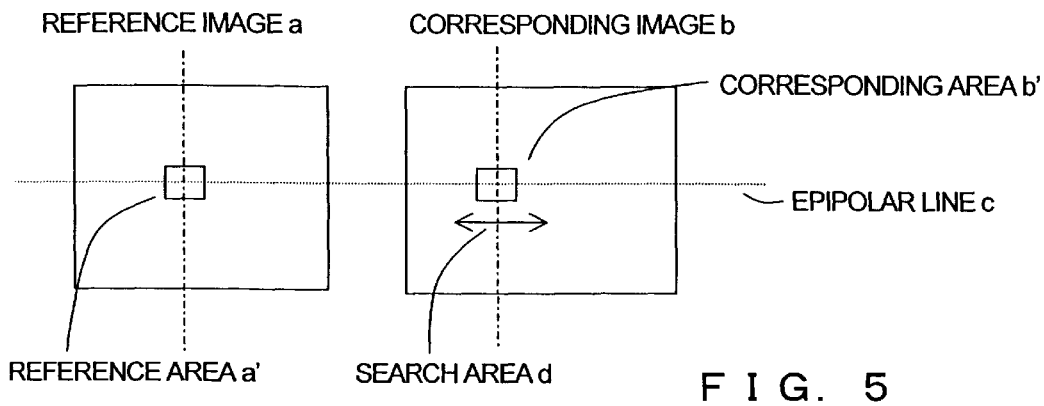
FIG. 5 is a view (1) illustrating a reference image and an image corresponding thereto.

FIG. 5 illustrates a reference image and a corresponding image. The point to be instructed by the mouse is, for example, the center of a reference area a' in the reference image a of FIG. 5. The reference image a may be one of the right and left images. In step S70, the reference area a' is set around the point instructed by the mouse, and used as a template image (detailed in later-described image correlation processing). The size of the reference area a' is set beforehand as a parameter, and may be varied depending on an object to be measured.

In step S80, a corresponding area b' corresponding to the reference area a' is searched from the corresponding image b. This search is executed on an epipolar line c similar to that of the reference image a on the corresponding image b. The epipolar lines c of the reference image a and the corresponding image b correspond to each other, and are in coincidence with each other. In this case, the vertical parallax of the image subjected to rectification by the orientation of step S10 is removed. On the overlapped portion of the right and left images, the image is corrected such that the corresponding area b' with respect to the reference area a' can be always present on the same line of the right and left images. For the search area d of the corresponding image b, the position identical to the center of the reference area a' instructed on the reference image a by the mouse is searched as the center of the search area d on the corresponding image b. In this case, the width of the search area is properly decided beforehand by, for example a parameter or the like, or varied depending on a target object. The corresponding point search processing is computed by the corresponding area search unit 6. For corresponding point search, for example, image correlation processing (described later) is utilized.

In step S90, a highest area of a correlation value calculated by image correlation processing is set as a corresponding area b'. Then, the corresponding area b' is set reversely on template. In step S100, an area corresponding to the corresponding area b' is searched on the reference image a.

Figure 6:
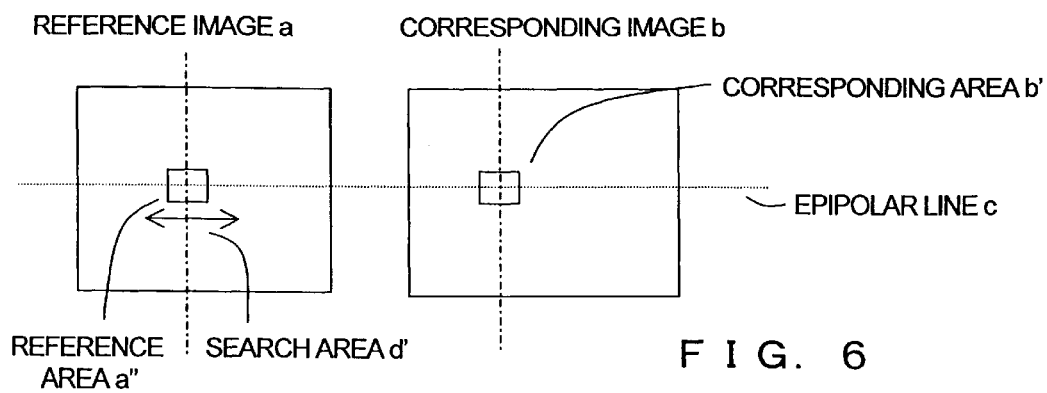
FIG. 6 is a view (2) illustrating the reference image and an image corresponding thereto.

FIG. 6 is a view (2) illustrating a reference image and a corresponding image. In this case, on the same epipolar line c, a search area d' is searched around the reference area a' based on the template. Also in this case, by the corresponding area search unit 6, searching is executed by later-described image correlation processing. In step S110, a corresponding area on the reference image is decided. In this case, a highest area of a correlation value is set as a reference area a", to realize the corresponding area. In step S120, determination is made by the corresponding area position verification unit 7 as to the coincidence of the position of the obtained corresponding area with the position of the reference area instructed first. In other words, coincidence between the reference area a' and the obtained reference area a" is verified.

In step S130, if OK, then an OK mark formed by the mark formation unit 3 is displayed on the center position of the corresponding area b' on the corresponding image b obtained in step S120. In step S140, if not good (NG) (not OK), then an NG mark formed by the mark formation unit 3 is displayed on the center position of the corresponding area b' on the corresponding image b obtained in step S120. At the mark formation unit 3, according to the determination verified by the corresponding area position verification unit 7, the image is made identifiable by changing the color of the mark on the corresponding image b, changing the shape or the like. For example, if there is an OK mark, a green mark is displayed, and if NG, a red mark is displayed, and so on, to enable identification at a glance. In addition, in steps S130 and S140, depth (Z) may be simultaneously calculated and displayed, and a correlation value or the like may also be displayed.

In step S150, if the Z control dial of the Z direction instruction unit 5 is rotated, then the process proceeds to the manual plotting of step S160. Specifically, if the displayed determination of step S130 or S140 is not proper, the Z direction instruction unit 5 is operated to execute plotting while manually performing measurement in the Z direction. This operation is carried out when plotting is wished even if the mark display in the corresponding image area is NG and measurement cannot be made on the automatic search mode, and when accurate plotting is wished even if the mark display is not NG, but reliability on determination is low and mistaken, and so on. If no Z direction instruction is made (dial is not rotated), then the process proceeds to step S170.

Figure 7:
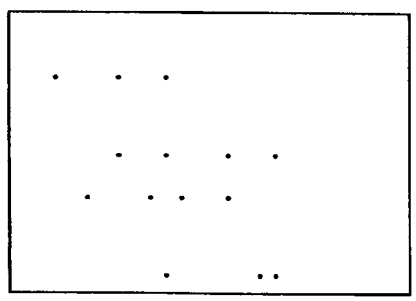
FIG. 7 is a view illustrating measurement of a plurality of points.
Figure 8:
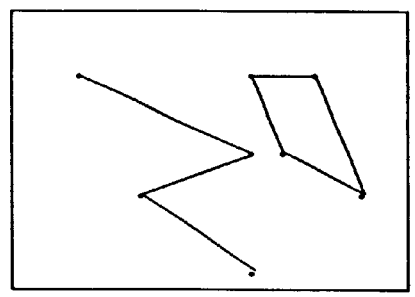
FIG. 8 is a view illustrating measurement of lines.

In step S170, if plotting is wished, the process moves to step S180. If not wished, the process moves to step S190. In step S180, plotting is carried out. Specifically, when measuring data is established by the mouse button, (corresponding area of the corresponding area search unit 6 is decided by the corresponding area deciding unit 11), and the measuring data of this time is written in the storage unit 10. A point where plotting has been established is made identifiable by changing color display or the like. If measurement is executed based on points, then a plurality of points can be measured by sequentially clicking the places of OK display. FIG. 7 illustrates the measurement of a plurality of points. If plotting is made by lines and drawings, for example, when a boundary line or a profile line is drawn, then plotting is carried out by clicking the starting value point and the end position of OK mark display. If the line measurement is continued, by continuing clicking, lines are connected sequentially by using the point as an established point. FIG. 8 illustrates such line measurement.

Figure 11:
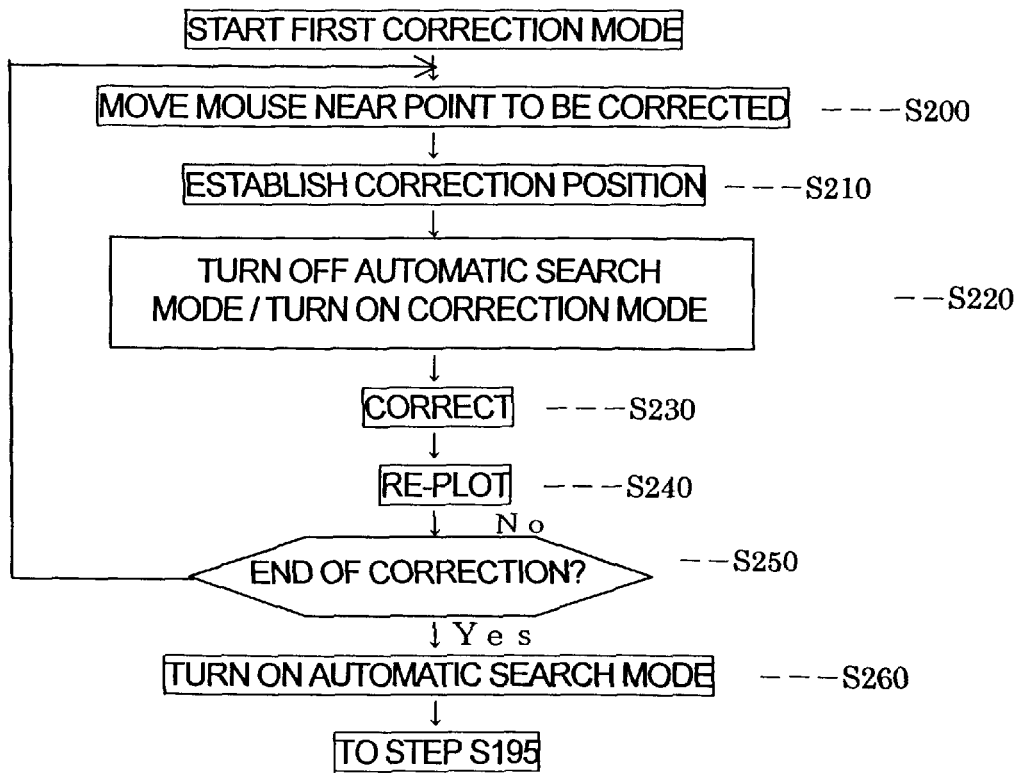
FIG. 11 is a flowchart of a first correction mode.
Figure 12:
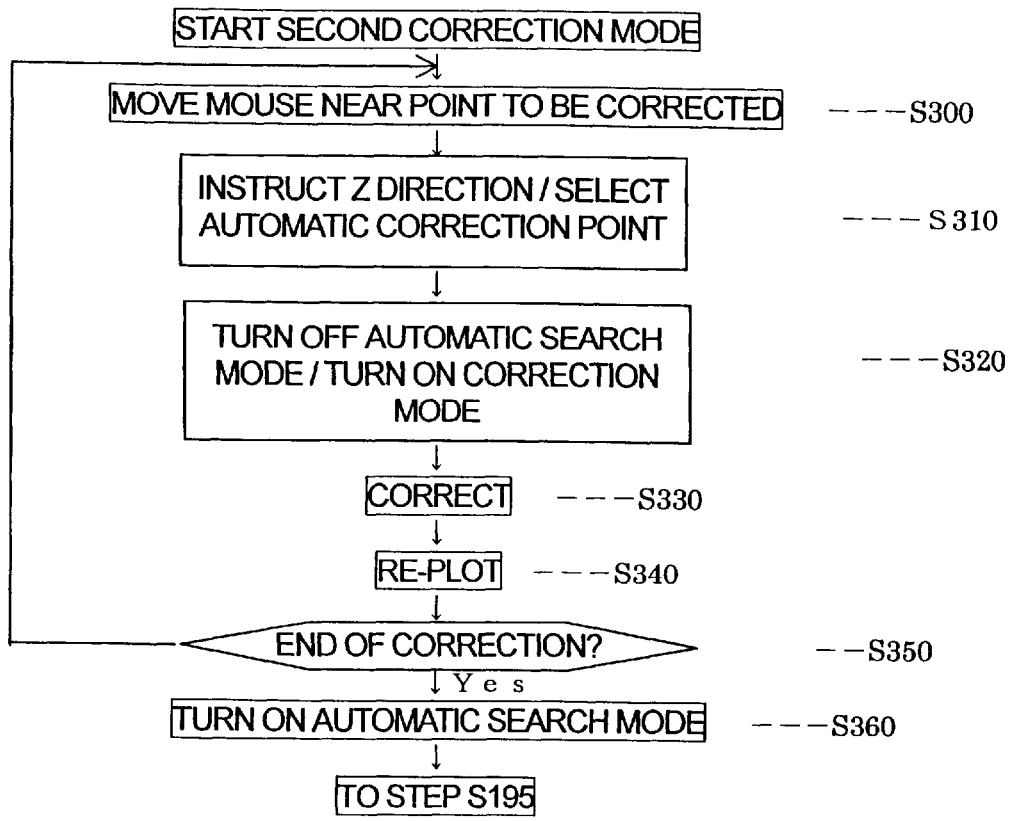
FIG. 12 is a flowchart of a second correction mode.
Figure 13:
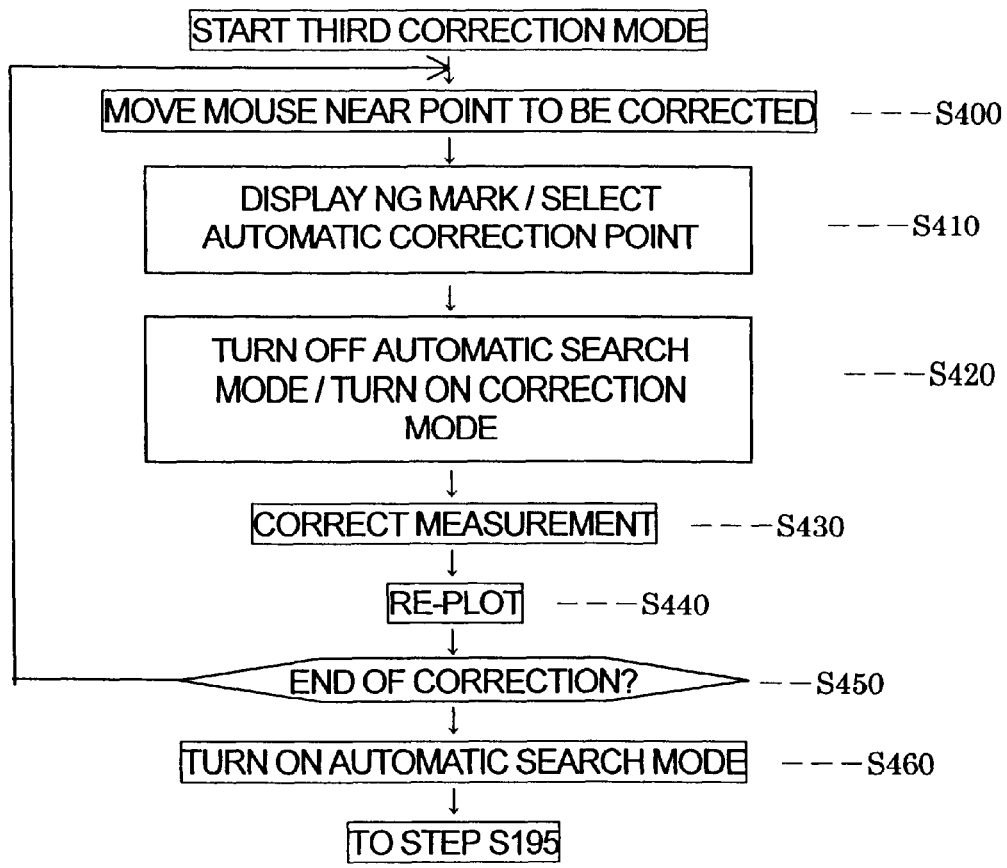
FIG. 13 is a flowchart of a third correction mode.

In step S190, if the plotted point is corrected, a correction mode is set (see steps S200, S300 and S400 of FIGS. 11, 12 and 13). If no correction is necessary, then the process proceeds to a next step S195. In step S195, if the measurement is continued, the process returns to step S40 to repeat the processing.

By the foregoing processing, simple plotting can be carried out, since on the automatic search mode, the corresponding position on the corresponding image b with respect to the mouse position on the reference image a is always determined and displayed.

Figure 9:
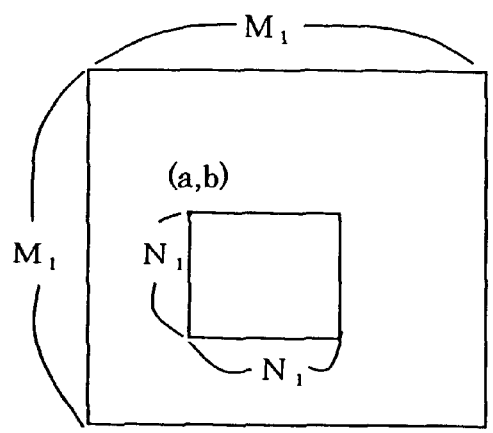
FIG. 9 is a view illustrating image correlation processing.

FIG. 9 illustrates image correlation processing. For the image correlation processing, a sequential similarity detection algorithm method (SSDA method), a correlation coefficient method, and so on, can be used. Here, the normalized cross correlation coefficient method is described.

(Method Based on Normalized Cross Correlation Coefficient)

As shown in FIG. 9, the template image of $N_1 \times N_1$ pixels is moved on a search range $(M_1-N_1+1)^2$ in the input image having a larger number of pixels, i.e., $M_1 \times M_1$, the upper left position of the template image is obtained such that COR (a, b) of an equation below can be maximum, and then it is determined that the template image has been searched.

$$COR(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma_{ab}} T_\sigma}} \quad (1)$$

where $$\bar{I} = \frac{1}{N_1^2} \sum_{m_1=0}^{N_1-1} \sum_{n_1=0}^{N_1-1} I_{(a,b)}(m_1, n_1) \quad (2)$$

$$\bar{T} = \frac{1}{N_1^2} \sum_{m_1=0}^{N_1-1} \sum_{n_1=0}^{N_1-1} T(m_1, n_1) \quad (3)$$

$$I_{\sigma_{ab}} = \frac{1}{N_1^2} \sum_{m_1=0}^{N_1-1} \sum_{n_1=0}^{N_1-1} \{I_{(a,b)}(m_1, n_1) - \bar{I}\}^2 \quad (4)$$

$$T_\sigma = \frac{1}{N_1^2} \sum_{m_1=0}^{N_1-1} \sum_{n_1=0}^{N_1-1} \{T(m_1, n_1) - \bar{T}\}^2 \quad (5)$$

$I_{(a,b)}(m_1, n_1)$: partial image of input image
$T(m_1, n_1)$: template image In this case, with T set as a reference area a', the largest point of COR (a, b) is detected as a corresponding area b'. As processing of the corresponding area search unit 6, the correlation processing method was described. However, the sequential similarity detection algorithm method or other corresponding point search method may be used.

Now, description will be made for the manual plotting of step S160 when the Z direction is instructed. FIG. 10 is a specific flow showing in detail the manual plotting.

In step S161, when the dial of the Z direction instruction unit 5 is rotated (step S150), the automatic search mode is automatically turned OFF to change to a manual plotting mode. In step S162, the Z direction (height) is measured. If a system configuration has only the first display unit 1 of FIG. 1, then, as shown in FIG. 5, points to be measured on the right and left images are always present on the same epipolar line c, and thus measurement is performed while comparing the right and left images of the first display unit 1 with each other. In this case, with the position of the planar direction instruction unit 4 set as a reference, the dial of the Z direction instruction unit 5 is rotated to control the Z direction, and the mark on the corresponding area on the corresponding image can be moved. Accordingly, the mark is moved to a correct position. In this case, with the reference image and the corresponding image set reverse to each other, and with the corresponding image set as a reference, the mark on the reference image may be moved. If a system configuration has the stereo-monitor of the second display unit 2, then more specific measurement is enabled. In this case, if the measurement of a point to be measured is mistaken, then the measured point is seen to float or fall from a position, where the point should be placed originally, on the stereo-monitor. Thus, measurement can be carried out more clearly than the first display unit 1. For the measurement, the Z direction is controlled by the Z direction instruction unit 5 while watching the stereo-monitor, and the mark is aligned with an accurate height position.

In step S164, if measurement is OK, then plotting is executed. If OK, measuring data is established by pressing the mouse button, and the measuring data is written in the storage unit 10. In step S166, if the manual plotting is continued, the process proceeds to step S167. If the manual plotting is finished, the process moves to step S168. In step S167, the mouse is moved to a next place to be measured. Then, the process returns to step S162, and the measuring work is repeated. In step S168, the manual plotting work is finished, the automatic search mode is turned ON, and then the process proceeds to step S190 of FIG. 4.

Next, description will be made for a case where verification is made by the display regarding the correction of the plotted point, and then correction is executed. For a correction mode, three types described below are available.

FIG. 11 is a flowchart showing a first correction mode.

In step S200, the mouse is moved near a point to be corrected. In step 210, a correction position is established. Specifically, when the mouse button is pressed near the point to be corrected, the decided corresponding area correction unit 12 outputs instruction, and the position of a point to be corrected, which is the closest to the X, Y position of the mouse stored in the storage unit 10, is automatically selected by the corresponding area deciding unit 11 and displayed. By this work, the correction plot point of the storage unit 10 is established. In step S220, the automatic search mode is turned OFF, and the correction mode is turned ON simultaneously with step S210.

In step S230, correction work is carried out. The correction work is carried out as follows. If the system configuration has only the display unit 1 of FIG. 1, then, as shown in FIG. 5, since plotted points on the right and left images are always present on the epipolar line c, correction is executed while comparing the right and left images of the display unit 1 with each other. In this case, with the position of the planar direction instruction unit 4 set as a reference, the dial of the Z direction instruction unit 5 is rotated to control the Z direction, and thus the mark on the corresponding area on the corresponding image can be moved. Accordingly, the mark can be moved to a correct position. In this case, with the reference image a and the corresponding image b set reverse to each other, and with the corresponding image b used as a reference, the mark on the reference image a may be moved. If the system configuration has the stereo-monitor of the second display unit 2, more specific verification and correction are enabled. In this case, if the plotted point is mistaken, then the plotted point is seen to float or fall from a position, where the point should be set originally, on the stereo-monitor, and thus verification can be carried out more clearly than the display unit 1. For the correction, the Z direction is controlled by the Z direction instruction unit 5 while watching the stereo-monitor, and the mark is aligned with an accurate height position while rotating the dial.

In step S240, if the correction is OK, re-plotting is carried out. Specifically, by clicking the mouse button, the decided corresponding area correction unit 12 understands that the correction point has been measured, establishes X, Y and Z coordinate values outputted from the instruction unit 40 on the corresponding area deciding unit 11, and then instructs the storage unit 10 to re-store the values. By this work, the corrected measured value is written in the storage unit 10. In step S250, if further correction is executed, the process returns to step S200 to continue the correction work. In step S260, if the correction mode is finished, then the automatic search mode is turned ON, and the process proceeds to step S195.

FIG. 12 is a flowchart showing a second correction mode. Now, automatic correction mode switching is described according to this flowchart. In this case, for example, on the automatic search mode, a point mistakenly plotted during plotting is corrected.

In step S300, the mouse is moved near a point to be corrected. In step S310, Z direction instruction is carried out. Thus, the point to be corrected is automatically selected. The dial of the Z direction instruction unit 5 is rotated for correction. This work serves as a trigger, and a correction plot point nearest a point instructed by the instruction unit is automatically established, and a point to be corrected in the storage unit 10 is selected. In step S320, the automatic search mode is automatically turned OFF, and the process enters the correction mode. In step S330, the correction is executed by rotating the dial of the Z direction instruction unit 5 for correction while watching the display unit. Correction processing is similar to that of step S230 of FIG. 11. In step S340, if the correction is OK, then the correction is established, and re-plotting is executed. In step S350, if further correction is carried out, then the process returns to step S300 to continue the correction work. In step S360, if the correction mode is finished, the automatic search mode is turned ON, and the process proceeds to step S195.

FIG. 13 is a flowchart showing a third correction mode. With reference to the flowchart, description will be made for automatic correction mode switching of a point mistakenly plotted (measured) even if the mark display is NG on the automatic search mode.

In step S400, the mouse is moved near a point to be corrected. In step S410, mark display becomes NG on the corresponding image, and a nearest NG plot point is automatically selected. In step S420, the automatic search mode is turned OFF, and the process enters the correction mode. In step S430, correction is executed. Correction processing is similar to that of step S230 of FIG. 11. In step S440, if the correction is OK, then the correction is established, and re-plotting is carried out. In step S450, if further correction is executed, then the process returns to step S400 to continue the correction work. In step S460, if the correction mode is finished, then the automatic search mode is turned ON, and the process proceeds to step S195.

As apparent from the foregoing, the correction work can be easily carried out without needing much time and labor. Thus, switching is made to the manual plotting mode automatically at a place to be manually measured, and the process returns to the automatic search mode when the manual plotting is finished, making the operation simple and easy. By such determination processing, anybody can easily perform plotting, and highly reliable position detection can be executed.

On the automatic search mode, real time processing is basically enabled, and the operation of FIG. 4 can be carried out even without each storing in the storage unit 10. However, further storing enables the following.

Figure 14:
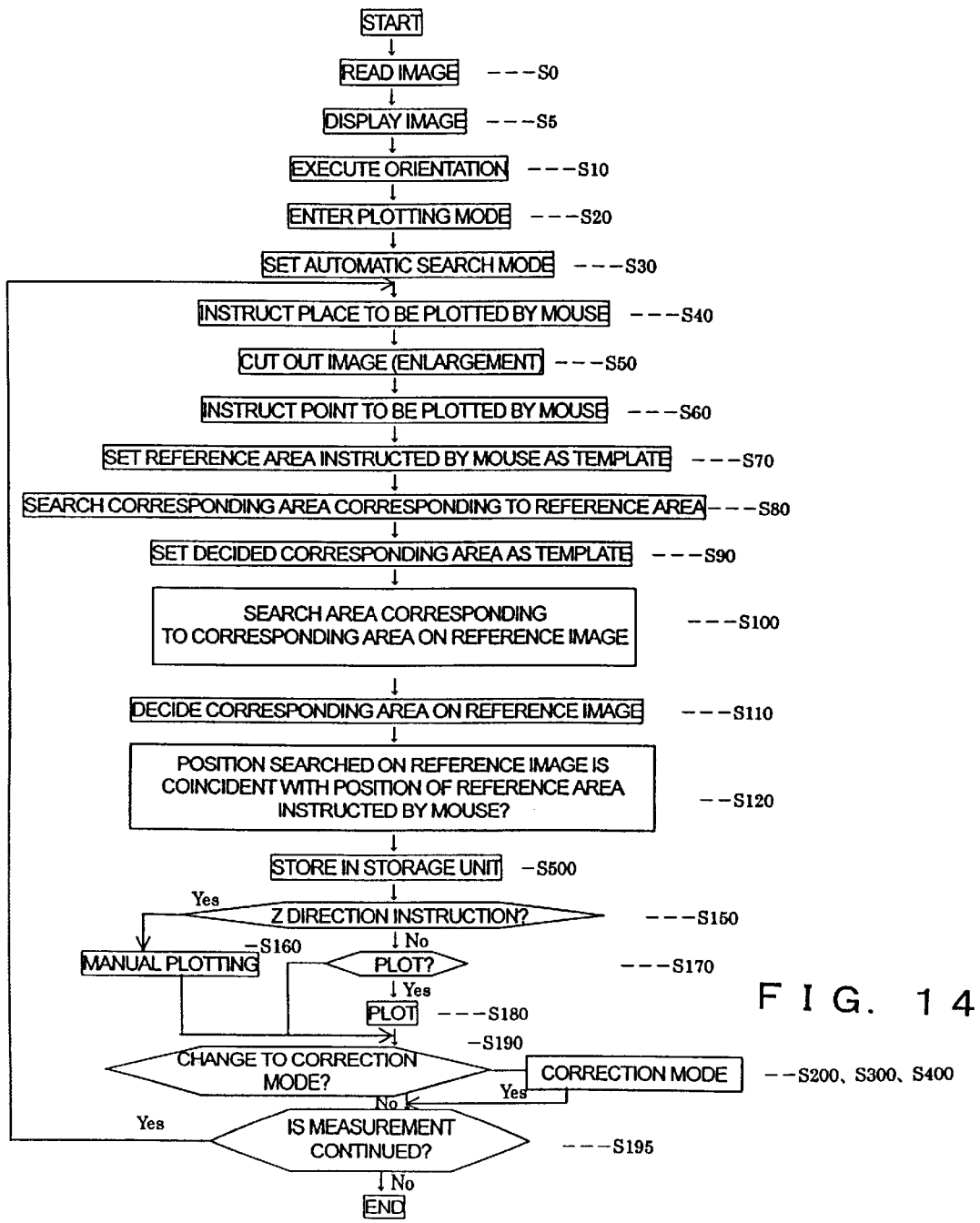
FIG. 14 is a second flowchart of stereo image measurement according to the present invention.

FIG. 14 is a second flowchart showing stereo image measurement according to the present invention.

This flowchart is similar in most parts to that of FIG. 4. A difference is that instead of displaying OK and NG in steps S130 and S140 of FIG. 4, storage is made in the storage unit of step S500. Specifically, the results obtained by searching the reference area instructed by the instruction unit 40 in the corresponding area search unit 6 and by verifying the same in the corresponding area verification unit 7 are sequentially stored in the storage unit 10. In this case, with regard to the determination of the corresponding area position verification unit 7, only the NG determination or only the OK determination may be stored; alternatively, both the OK and NG determination may be simultaneously stored. This work enables the following.

In the case of only the NG determination, since the NG data has been stored in the storage unit 10, even without displaying, the correction mode processing (FIGS. 11 to 13) can be similarly carried out. In other words, only by moving the mouse near the place of NG, the correction mode is set, enabling the automatic selection and correction of the point to be corrected.

In the case of only the OK determination, only the OK point, to which the mouse of the instruction unit 4 has been moved, is captured in the storage unit 10. Thus, by continuously instructing and moving the reference area with the mouse, the OK places of the corresponding points of the corresponding area can be continuously plotted. In this way, only by moving the mouse without each establishment, a large number of points can be measured and plotted within a short time. Further, the points thus obtained can be effectively utilized for making a TIN (Triangular Irregular Network) by connecting these points to express the shape of an object, or for performing automatic DTM measurement. For details, see Japanese Patent Applications Nos. 2000-93398, and 2000-93886.

In the case of both the OK and NG determination, the foregoing two operations can be carried out.

According to the present invention, even without stereoscopic viewing, anybody can carry out three-dimensional measurement and plotting easily without much skill, only by making correctness determination with the automatic calculation processing of the computer. In addition, the present invention is particularly advantageous in that even when a complex place is measured in detail, when measurement is mistaken, when the measured part having low reliability is corrected, or the like, plotting, verification and correction can be easily carried out, greatly saving power. Moreover, according to the present invention, such obtained three-dimensional data is utilized for TIN, DTM automatic measurement, and so on, making it possible to construct a high-speed, and highly reliable three-dimensional measuring system.

What is claimed is:

1. A stereo image measuring device comprising:
   a display unit for displaying a pair of stereo images;
   an instruction unit for instructing a reference area in one of the displayed pair of stereo images by an operation executed by an operator;
   a corresponding area search unit for obtaining an area corresponding to the reference area instructed in one of the stereo images, in the other of the pair of stereo images;
   a mark formation unit for forming a mark indicating the reference area instructed by said instruction unit and a mark indicating a corresponding point searched by said corresponding area search unit on the pair of stereo images respectively;
   a corresponding area deciding unit for deciding a searched corresponding area searched by said corresponding area search unit as a corresponding area;
   a storage unit for storing the decided corresponding area decided by said corresponding area deciding unit;
   a decided corresponding area correction unit for correcting the decided corresponding area; and
   a corresponding area position verification unit for determining whether the corresponding area searched by said corresponding area search unit corresponds to the reference area instructed by said instruction unit.

2. The stereo image measuring device according to claim 1,
   wherein said mark formation unit forms the mark indicating the reference area instructed by said instruction unit and the mark indicating the corresponding point decided by said corresponding area search unit on the pair of stereo images respectively to be identifiable by a determination result of said corresponding area position verification unit.

3. The stereo image measuring device according to claim 2, further comprising:
   a storage unit for storing a result of verification made by said corresponding area position verification unit, the reference area, the corresponding area, and the decided corresponding area decided by said corresponding area deciding unit.

4. The stereo image measuring device according to claim 1,
   wherein said mark formation unit displays a mark on said display unit for displaying the stereo images in parallel.

5. The stereo image measuring device according to claim 4,
   wherein said mark formation unit further displays a mark on a second display unit adapted to enable the stereo images to be seen stereoscopically.

6. The stereo image measuring device according to claim 1,
   wherein said corresponding area search unit obtains the corresponding point by correlation processing, and
   said corresponding area position verification unit obtains a corresponding reference area by a system similar to/different from that of said corresponding area search unit, and verifies coincidence of a position of the obtained corresponding reference area with a position of the reference area.

7. The stereo image measuring device according to claim 1,
   wherein said corresponding area search unit obtains the corresponding point by correlation processing, and
   said corresponding area position verification unit verifies coincidence of a position of the corresponding point with a position of a point of the reference area.

8. The stereo image measuring device according to claim 1,
   wherein the reference area instructed by said instruction unit is set according to one of a verification result by said corresponding area position verification unit, the reference area and the corresponding area, stored in said storage unit.

9. A stereo image measuring device comprising:
   a display unit for displaying a pair of stereo images;
   an instruction unit for instructing a reference area in one of the displayed pair of stereo images by an operation executed by an operator;
   a corresponding area search unit for obtaining an area corresponding to the reference area instructed in one of the stereo images, in the other of the pair of stereo images;
   a mark formation unit for forming a mark indicating the reference area instructed by said instruction unit and a mark indicating a corresponding point searched by said corresponding area search unit on the pair of stereo images respectively;
   a corresponding area deciding unit for deciding a searched corresponding area searched by said corresponding area search unit as a corresponding area;
   a storage unit for storing the decided corresponding area decided by said corresponding area deciding unit;
   a decided corresponding area correction unit for correcting the decided corresponding area; and
   a corresponding area position verification unit for determining whether the corresponding area searched by said corresponding area search unit corresponds to the reference area instructed by said instruction unit,
   wherein said display unit displays a result of determination verified by said corresponding area position verification unit to be identifiable, and according to a position instructed by said instruction unit, a search mode is interrupted to change to a correction mode.

10. The stereo image measuring device according to claim 9, wherein when the position instructed by said instruction unit is set near an area determined to have at least a corresponding failure by said corresponding area position verification unit, the search mode is interrupted to change to the correction mode.

11. The stereo image measuring device according to claim 9, wherein when the position instructed by said instruction unit is set near an area determined to have at least a corresponding failure by said corresponding area position verification unit, and said decided corresponding area correction unit is operated, the search mode is interrupted to change to the correction mode.

12. The stereo image measuring device according to claim 9, wherein the search mode is formed for causing said corresponding area search unit to obtain the corresponding area according to instruction of the reference area of said instruction unit, and when the corresponding area positioned by instruction of said instruction unit is set near the reference area having been decided by said corresponding area deciding unit in an automatic search mode, if said decided corresponding area correction unit is operated, the automatic search mode is interrupted to change to a manual plotting mode for causing said corresponding area deciding unit to decide a corresponding area according to instruction of said decided corresponding area correction unit.

13. The stereo image measuring device according to claim 9, wherein the search mode is formed for causing said corresponding area search unit to obtain the corresponding area according to instruction of the reference area of said instruction unit, and when the corresponding area positioned by instruction of said instruction unit is set near the reference area having been decided by said corresponding area deciding unit in an automatic search mode, if said decided corresponding area correction unit is operated, the automatic search mode is interrupted to change to the correction mode for causing said corresponding area deciding unit to decide a corresponding area according to instruction of said decided corresponding area correction unit.

14. The stereo image measuring device according to claim 1, wherein the search mode is formed for causing said corresponding area search unit to obtain the corresponding area according to instruction of the reference area of said instruction unit, and when a correction operation is executed by said decided corresponding area correction unit in an automatic search mode, the automatic search mode is interrupted, and said corresponding area deciding unit decides a corresponding area according to instruction of said decided corresponding area correction unit.

15. The stereo image measuring device according to claim 9, wherein the search mode is formed for causing said corresponding area search unit to obtain the corresponding area according to instruction of the reference area of said instruction unit, and when a correction operation is executed by said decided corresponding area correction unit in an automatic search mode, the automatic search mode is interrupted, and said corresponding area deciding unit decides a corresponding area according to instruction of said decided corresponding area correction unit.

* * * * *